United States Patent [19]

Williamson

[11] Patent Number: 5,317,783
[45] Date of Patent: Jun. 7, 1994

[54] VACUUM TRAILER

[75] Inventor: Harry L. Williamson, Franklin, Ky.

[73] Assignee: Haybuster Manufacturing Inc., Jamestown, N. Dak.

[21] Appl. No.: 951,388

[22] Filed: Sep. 25, 1992

[51] Int. Cl.$^5$ .............................................. E01H 1/08
[52] U.S. Cl. ........................................ 15/346; 15/340.1; 15/347; 15/352
[58] Field of Search ................ 15/347, 352, 340.1, 15/340.3, 340.4, 346

[56] References Cited

U.S. PATENT DOCUMENTS

| 514,676 | 2/1894 | Furnas | 15/340.1 |
|---|---|---|---|
| 2,590,734 | 3/1952 | Strong | 55/118 |
| 2,887,714 | 5/1959 | Hanson | 15/347 X |
| 3,007,191 | 11/1961 | Braun | 15/346 |
| 3,172,143 | 3/1965 | Yucis et al. | 15/346 X |
| 3,203,022 | 8/1965 | Clarke | 15/340 |
| 3,222,853 | 12/1965 | Michael | 15/348 X |
| 3,229,320 | 1/1966 | Cymara | 15/348 |
| 3,243,834 | 4/1966 | Trapp | 15/340 |
| 3,665,545 | 5/1972 | Beekman | 15/340.1 X |
| 3,744,653 | 7/1973 | Jensen | 15/347 X |
| 3,819,069 | 6/1974 | Bauman et al. | 15/340.1 X |
| 3,881,215 | 5/1975 | Krier et al. | 15/340 |
| 4,019,219 | 4/1977 | Willenborg | 15/339 |
| 4,200,950 | 5/1980 | Coverley | 15/340.1 X |
| 4,373,227 | 2/1983 | Kimzey et al. | 15/340.3 X |
| 4,393,537 | 7/1983 | Reprogle et al. | 15/348 |
| 4,660,248 | 4/1987 | Young | 15/340 |
| 5,218,737 | 6/1993 | Dansby et al. | 15/347 |

Primary Examiner—Chris K. Moore
Attorney, Agent, or Firm—Westman, Champlin & Kelly

[57] ABSTRACT

A vacuum trailer for picking up litter in cut and uncut grass areas having a frame towable behind a tractor. The trailer has a fan to generate a suction force which is powered by the power take-off shaft of the tractor. A closed container receives the litter and the litter is volumetrically compressed inside the container and then discharged from the container. A pivoting intake and exhaust deck is provided to maintain a constant distance from the ground during operation and to allow for fast transporting of the trailer.

19 Claims, 5 Drawing Sheets

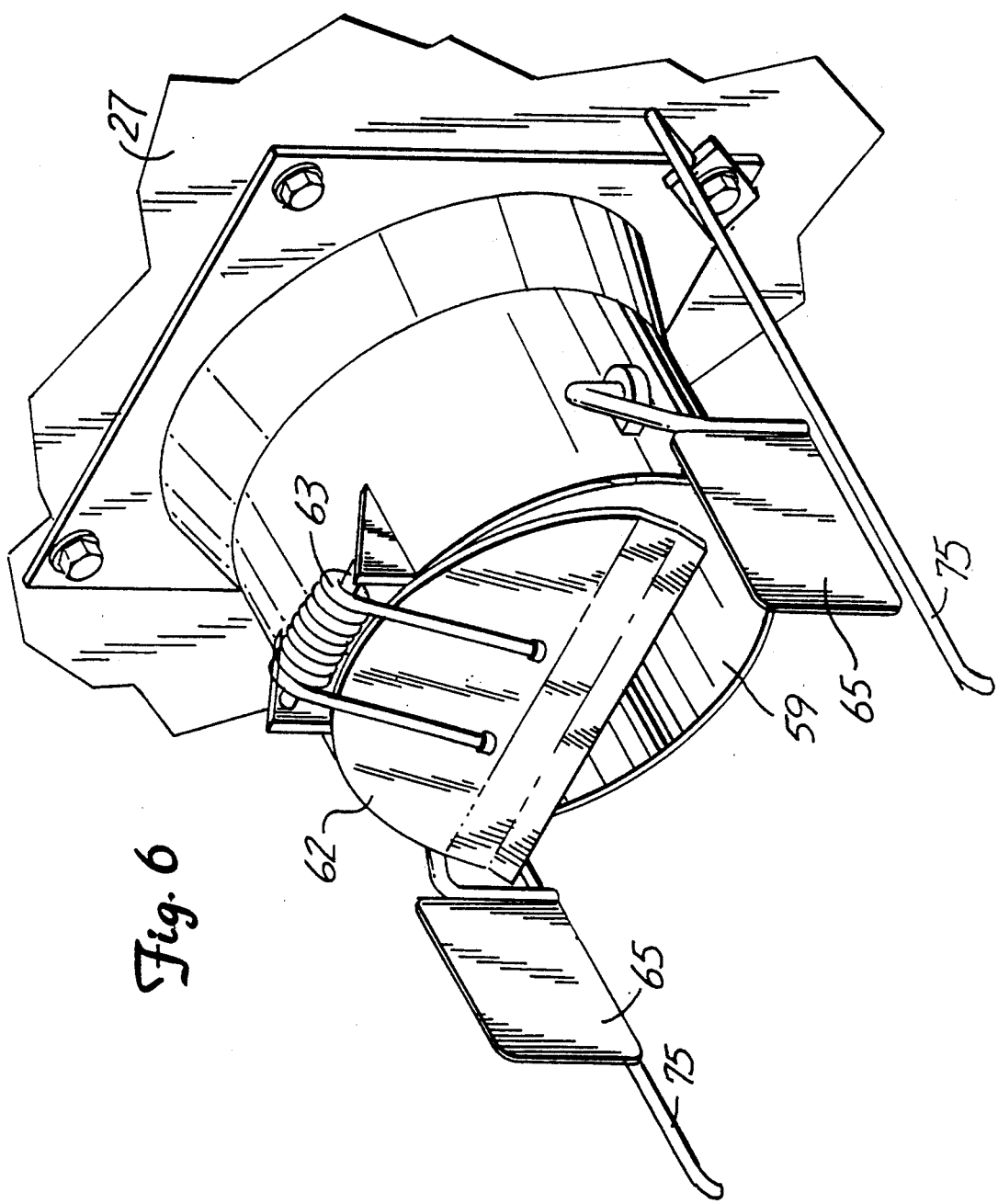

5,317,783

VACUUM TRAILER

BACKGROUND OF THE INVENTION

The present invention relates to a vacuum trailer for picking up litter in cut and uncut grass areas. In particular, the invention is a vacuum trailer for picking up litter having a pivoting intake and exhaust deck with a suction mouth in communication with a closed container to hold the vacuumed-up litter, wherein the litter is volumetrically compressed and discharged into a garbage bag.

Devices for collecting litter, leaves, and other debris, from streets and grassy areas have been around for a number of years. In 1894, U.S. Pat. No. 514,676 was issued for a Street Sweeper having a fan to generate a suction force and a trailer to catch the sucked up debris.

More recently, U.S. Pat. No. 4,019,219 disclosed a trash compacting apparatus having a containment unit on a truck with a suction fan and an extending arm attached to the suction fan for sucking up debris, and a method to compact the debris or trash in the containment unit.

The prior art indicates there is a long felt need for an apparatus of this type. Recent efforts in this field indicate that there is still a need for an efficient, cost effective, and reliable way to collect litter.

SUMMARY OF THE INVENTION

The present invention relates to a vacuum trailer for picking up litter in cut and uncut grass areas having a frame towable behind a tractor. The vacuum trailer of the present invention is efficient because it compresses the collected litter before expelling it from the unit, thus using fewer garbage bags than if the litter was not compressed before bagging. It is cost effective because it is mounted on a trailer so the consumer does not need to buy an expensive self propelled vehicle if they already have a tractor. Also, the present invention is reliable because it has only two main moving parts which makes it less susceptible to failure and thus more reliable than most other ground vacuums.

A centrifugal fan is carried on a trailer frame and is housed in a fan shroud. A pivoting intake and exhaust deck for collecting litter and exhausting air, a closed container for containing the collected litter, and a receiving deck for receiving the discharged litter and supporting an operator are also mounted on the frame.

A suction force to draw in litter, leaves, and other debris is created by the centrifugal fan. A coupling conduit is provided from the fan shroud down to the intake and exhaust deck in order to provide an inflow of air at a suction mouth near the grass. A fan discharge chute connects the outlet of the fan shroud to the closed container thus providing a continuous path from the suction mouth to the closed container. The sucked up litter enters the suction mouth, flows through the flexible coupling conduit and into the fan shroud where it is shredded by the centrifugal fan and blown through fan discharge chute into the closed container.

An exhaust manifold is also provided on the intake and exhaust deck, and it is positioned in front of the suction mouth. The exhaust manifold has a number of exhaust ports connected to the closed container by flexible coupling conduit for exhausting air from the closed container. The exhausted air from the closed container discharges from a first air exhaust port at the top of the closed container. A mesh screen is provided inside the container between the first air exhaust port and the interior of the container to retain the litter inside the container.

The intake and exhaust deck is pivotable via a hydraulic cylinder powered by the tractor's hydraulic system. The deck is pivotable to allow the deck to be raised for transporting the trailer between working areas. The top speed for the trailer when vacuuming is approximately 5 miles per hour. The intake and exhaust deck also has a plurality of gauge wheels which roll across the surface being vacuumed to keep the intake and exhaust deck a constant distance from the ground while in operation.

A helical auger to volumetrically compress the litter and to discharge the compressed litter from the closed container is housed in an open top trough inside the closed container. A spring-loaded discharge door is provided near the end of the auger trough to allow the litter to exit. The auger compresses the litter against the spring-loaded discharge door which provides a compression force on the litter. The helical auger, like the pivotable intake and exhaust deck, is powered with a hydraulic motor by the tractor's hydraulic system.

A second air exhaust port may be provided below the auger to help direct the litter into the auger by providing a slight suction force toward the auger. Like the first exhaust port, the second exhaust port has a mesh screen between the second air exhaust port and the interior of the container to prevent litter from escaping the closed container. The second exhaust port exhausts the air directly under the trailer.

A receiving deck is outside the closed container mounted to the rear of the vacuum trailer. Situated on the receiving deck is an operator's chair. For the most efficient use of the present invention, a first operator is necessary to drive the tractor, and a second operator watches the discharged litter fill garbage bags and changes the garbage bag when it is full.

BRIEF DESCRIPTION OF THE DRAWINGS

FIG. 6 is a greatly enlarged view of a spring loaded discharge door of the type used on the vacuum trailer of the present invention.

DETAILED DESCRIPTION OF THE PREFERRED EMBODIMENTS

Figure 1:
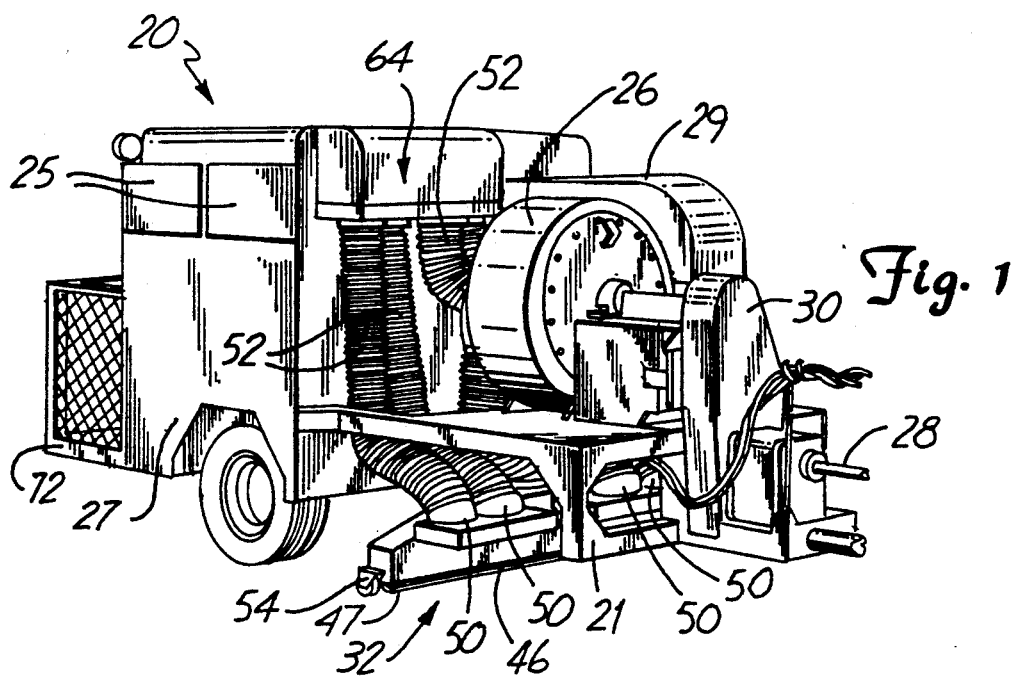
FIG. 1 is a view in perspective of a vacuum trailer made according to the present invention.

A vacuum trailer for picking up littler in cut and uncut grass areas made according to the present invention is shown generally at 20. The vacuum trailer 20, which has a frame 21, is designed to be towed behind a tractor 19. The trailer 20 is connected to the tractor 19 through a hitch 22 in a commonly known manner.

A centrifugal fan 24 is provided in a fan shroud 26 to generate a suction force needed to vacuum litter, leaves, and debris from the ground. A drive shaft 28 is connected to the power take-off shaft of the tractor in a commonly known manner. A belt drive system, inside a housing 30, connects the drive shaft 28 to the centrifugal fan 24 in order to power the fan 24 at a desired speed. A closed container 27 is provided to receive the vacuumed litter. A fan discharge chute 29 connects the fan shroud 26 to the container 27. The interior of the closed container 27 has slanted side walls 31 forming a funnel to channel the litter toward an auger 56 which will be described below. Access doors 25 are provided on both sides of the closed container 27 to allow operators to service the auger 56 or to clean the inside of the unit.

Figure 5:
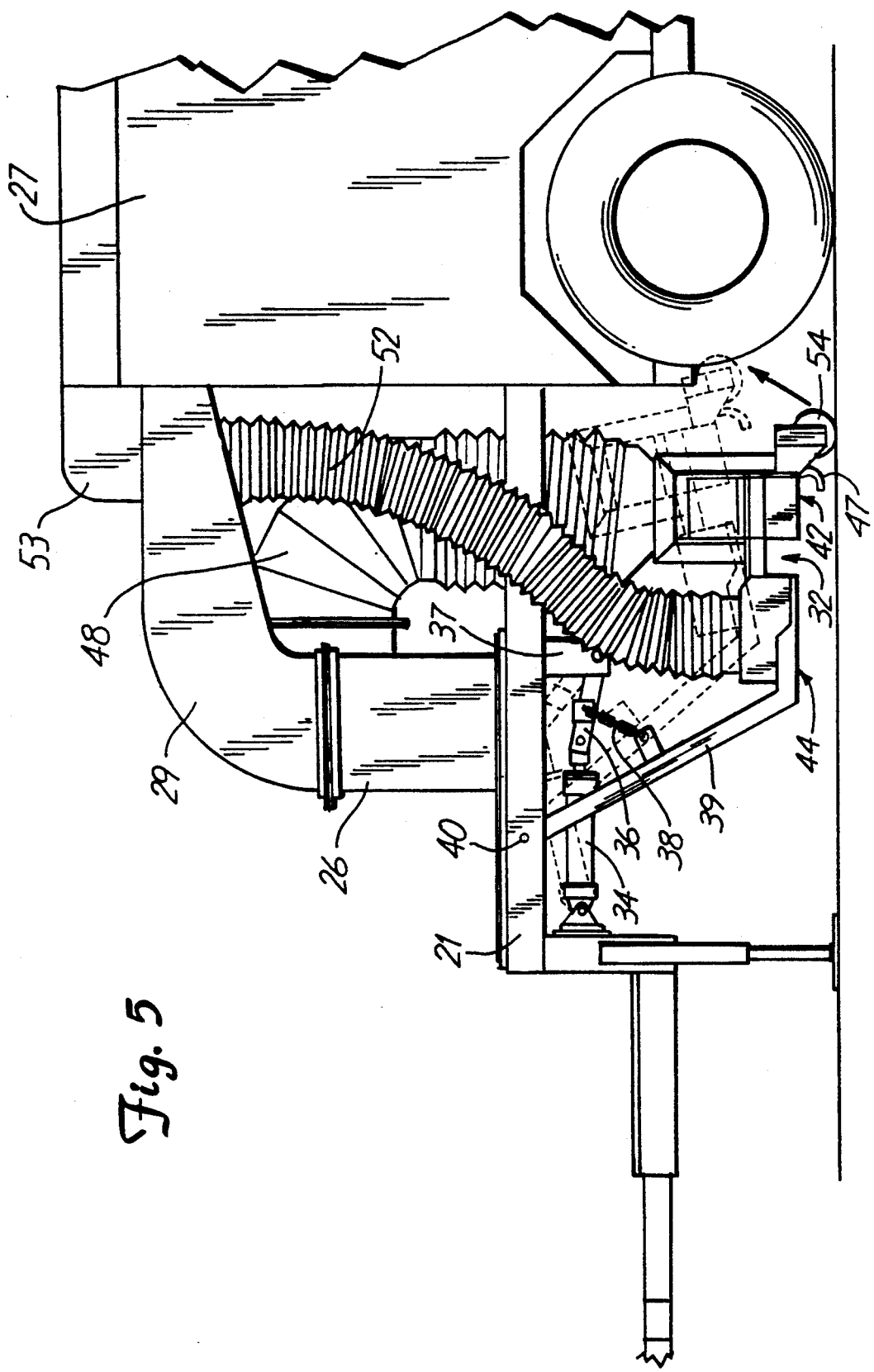
FIG. 5 is a view of a pivoting intake and exhaust means of the vacuum trailer of the present invention.

A pivotable intake and exhaust deck 32 is mounted to the trailer frame 21 as shown in FIG. 5. The intake and exhaust deck 32 is pivotable to allow the deck 32 to be raised for transporting the trailer 20 between work sites. The average working speed of the vacuum trailer 20 is approximately five miles per hour, and a higher rate of speed is desired for transporting the trailer 20. The intake and exhaust deck 32 is raised away from the ground for transport to avoid damaging the unit.

A hydraulic cylinder 34 is pivotally connected to the trailer frame 21 as shown in FIG. 5. The other end of the cylinder 34 is pivotally connected to a link bar 36 which in turn is pivotally connected to a mounting ear 37 to form a folding link. An intake and exhaust deck pivot arm assembly 39 connects the intake and exhaust deck 32 to the vacuum trailer frame 21 at suitable pins on selected fore and aft frame members about a pivot 40. A chain 38 connects the intake and exhaust deck pivot arm assembly 39 to the link bar 36. When the hydraulic cylinder 34 is actuated, the link bar 36 rotates upward pulling with it the chain 38 which in turn pulls the intake and exhaust deck pivot arm assembly 39 upward, raising the intake and exhaust deck 32.

Figure 2:
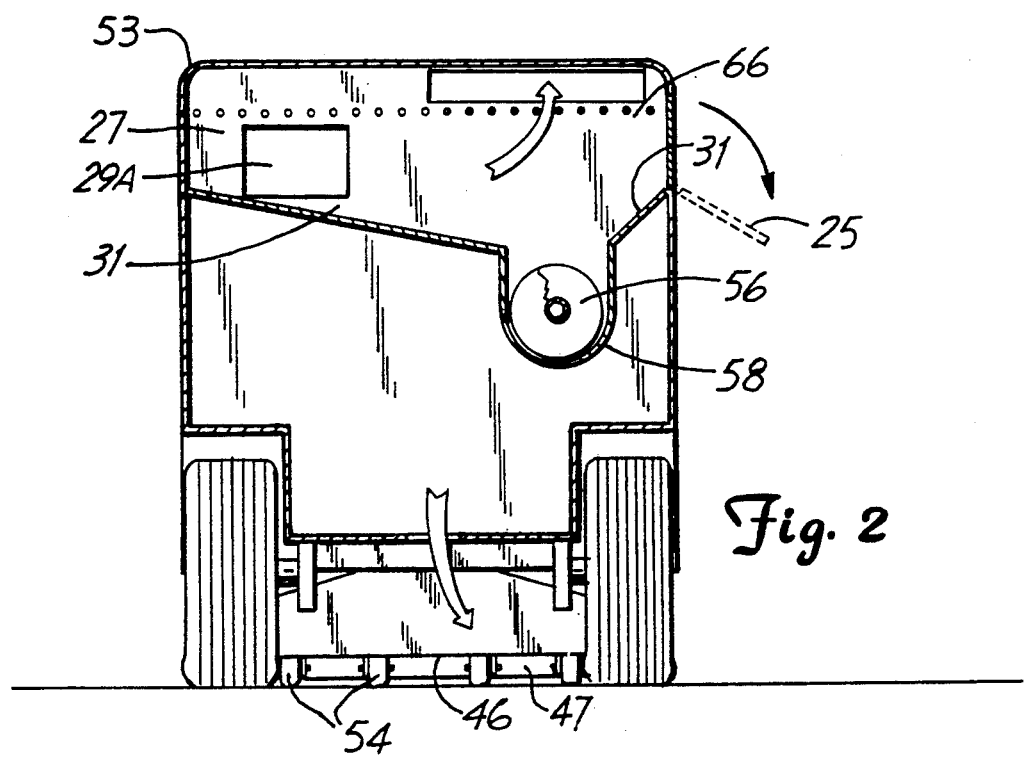
FIG. 2 is a sectional view of the vacuum trailer taken along line 2—2 of FIG. 1.
Figure 3:
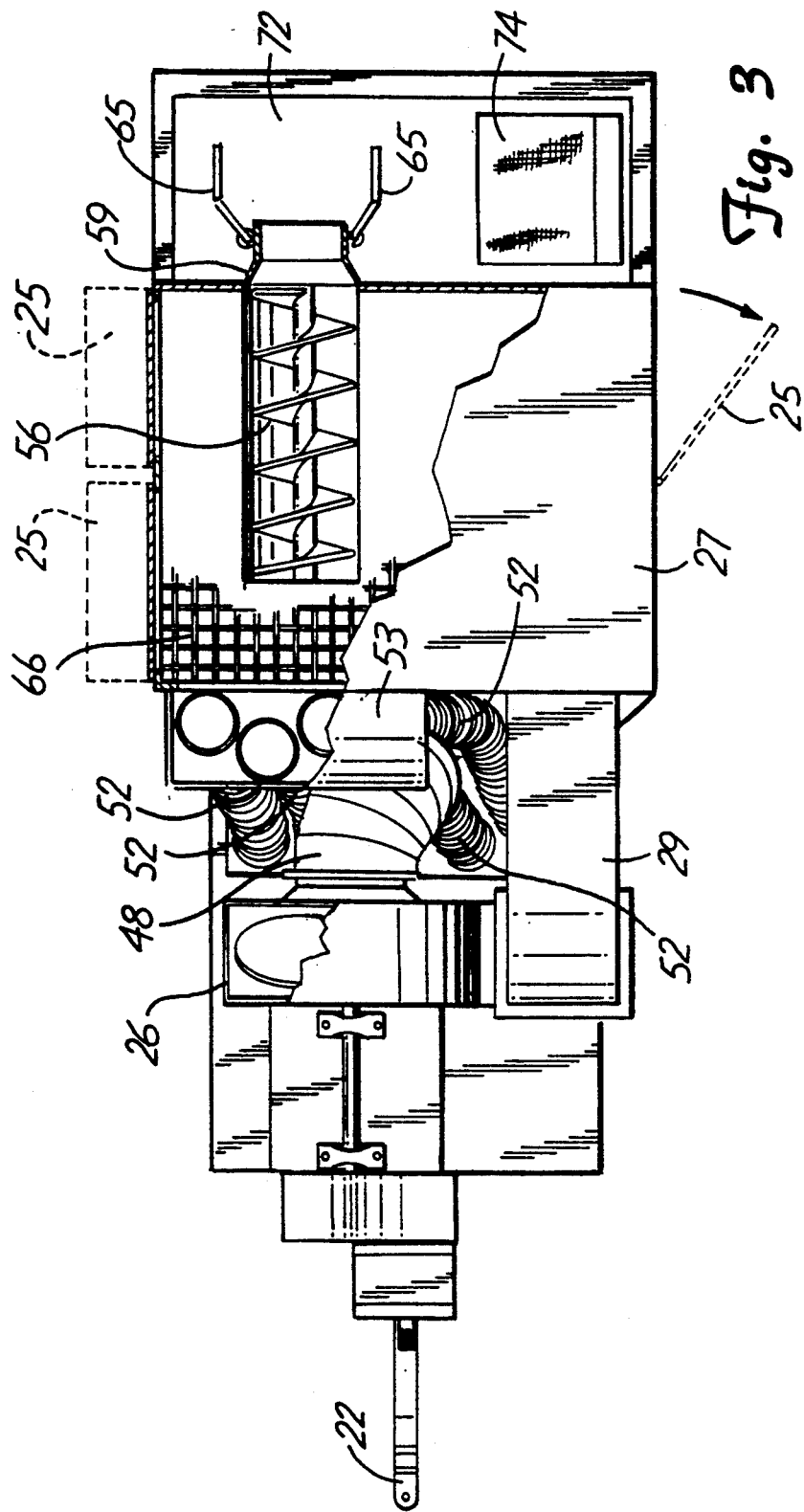
FIG. 3 is a top plan view of the vacuum trailer with portions cut away.

The intake and exhaust deck 32 has two sections; an intake section shown generally at 42, and an exhaust manifold shown generally at 44. The intake section 42 has a large suction mouth 46 as is shown in FIGS. 1 and 2. A scoop 47 to help lift and catch litter being sucked up is mounted to the suction mouth 46. A large flexible coupling conduit 48 connects the suction mouth or port 46 of the intake and exhaust deck 32 to the intake of fan shroud 26 which provides the suction mouth 46 with the suction force necessary to vacuum litter, leaves, and other debris from the ground.

The exhaust manifold 44 of the intake and exhaust deck 32, as can be seen in FIG. 5, is positioned in front of the intake section 42. The exhaust manifold 44 has a number of exhaust ports 50 which spread across the width of the exhaust manifold 44. The exhaust ports 50 have a combined cross sectional area greater than that of the large flexible coupling conduit 48 between the suction mouth 46 and the fan shroud 26. The larger cross sectional area allows the air in the system to be free flowing and to maximize the vacuum condition.

Flexible coupling conduits 52, which individually have a smaller diameter than the large flexible coupling conduit 48, connect the exhaust ports 50 to a plenum 53 leading from the closed container 27. Gauge wheels 54 are attached to the bottom rear of the exhaust deck 32 to roll across the ground during vacuuming operation thus keeping the intake and exhaust deck 32 a constant distance from the ground. Because the intake and exhaust deck 32 is pivotally mounted to the frame, it is able to follow the contours of the ground very closely.

A helical auger 56 is housed in the closed container 27. The auger 56 sits in a U-shaped trough 58 designed to catch and hold the litter as it falls toward the auger 56 after entering the container 27 from the chute 29 through a port 29A (FIG. 2). An exhaust port 68 below the auger 56 may be provided to provide a minor flow of outer air to help attract litter into the trough 58.

The auger 56 is driven by a hydraulic motor powered from the hydraulic system of the tractor 19. The auger trough 58 is connected to a debris discharge tube 59 which extends rearward of the rear wall of closed container 27. The discharge tube 59 has a tapered collar which reduces in diameter from the auger to aid in the compression of the litter. A spring loaded discharge door 62 is provided at the end of the discharge tube 59 with a torsional spring 63 providing the spring load. The discharge door 62 provides both an exit port for the litter, and a positive support to allow the auger 56 to compress the litter before discharging it. The combination of the spring loaded discharge door 62 and the reduced diameter of the discharge tube 59 cause the litter to be compressed to approximately a 5:1 compression ratio. Such a compression ratio allows much more litter, leaves and debris to be packed into a garbage bag for the most efficient use. Guide arms 65 are attached to the discharge tube 59, as illustrated in FIG. 6, and extend rearward to guide the compressed litter being expelled from the tube 59 into garbage bags.

The discharge door 62 in the preferred embodiment is only approximately one half the size of the discharge tube 59, but any size discharge door that provides sufficient resistance to allow compression of the litter may be used.

Figure 4:
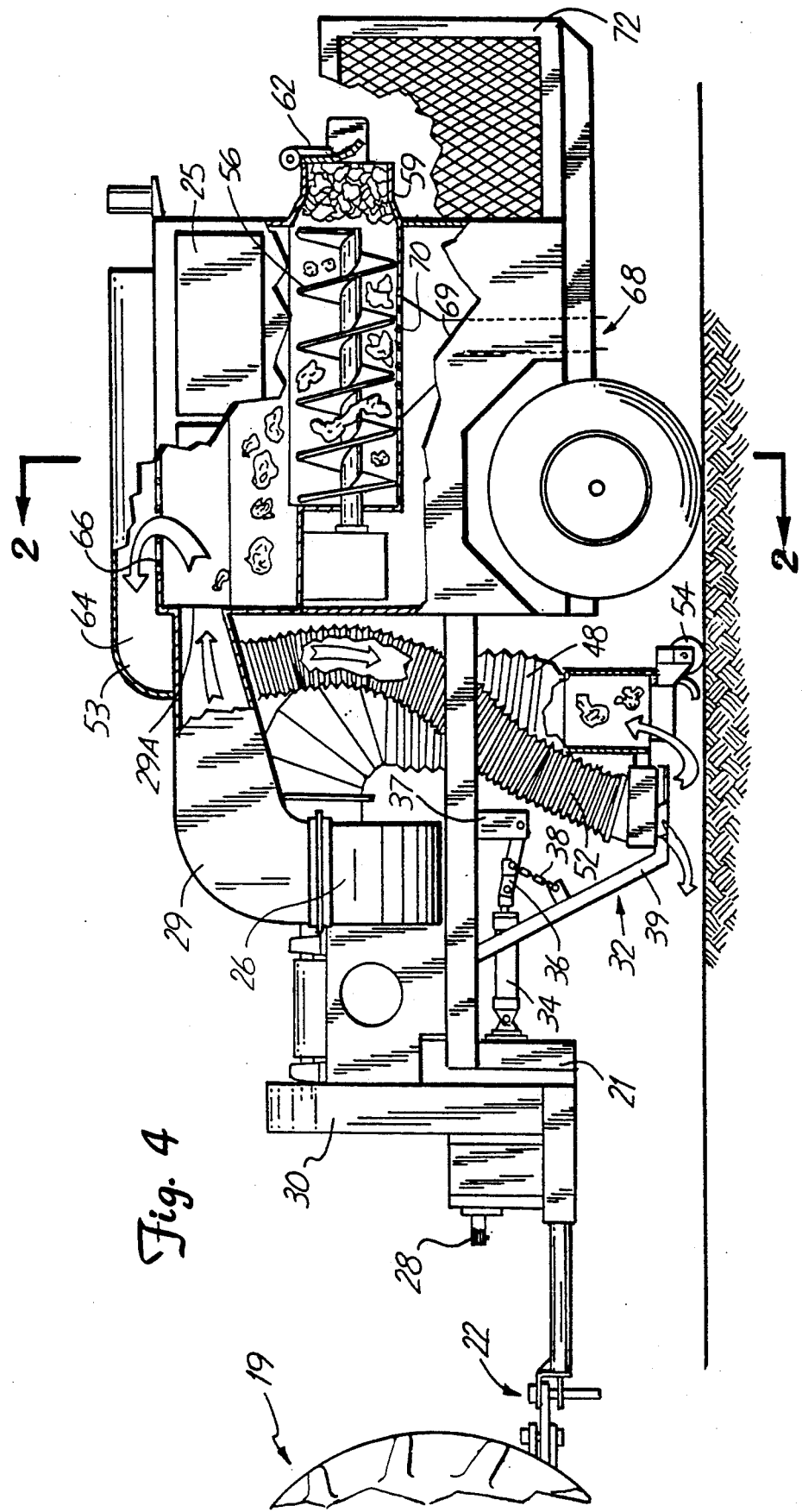
FIG. 4 is a side view of the vacuum trailer of FIG. 1 with portions cut away.

Exhaust ports are provided at the top and may be at the bottom of container 27. Top exhaust ports 64 in plenum 53 connect to the flexible coupling conduits 52 to provide a continuous exhaust path down to the intake and exhaust deck 32. A mesh screen 66 is positioned between the plenum 53 and exhaust ports 64 and the interior of the closed container 27, as seen in FIG. 4, to retain the litter and debris in the container 27. Only those particles small enough to fit through the holes of the screen 66 will be exhausted. The incoming litter from the chute 29 is blown into the closed container 27 directly adjacent to the screen 66 to scour away any litter stuck to the screen 66.

As previously mentioned, a bottom exhaust port 68 connected by exhaust conduit 69 may also be provided in the closed container 27. A bottom mesh screen 70 may be provided between the bottom exhaust port 68 and the interior of the closed container 27 for the same reason as the top mesh screen 66. The bottom exhaust port 68 may be exhausted directly out the bottom of the container 27 as illustrated in FIG. 4, thus exhausting the air under the trailer 20. The bottom mesh screen 70 may be replaced with screens of varying size holes to classify the size of particles allowed to fall through to be exhausted to the ground. In other preferred embodiments, the bottom exhaust conduit 69 may be coupled to the exhaust manifold 44, or routed to expel the air behind the trailer 20. The flow of air out exhaust port 68 creates a flow that directs materials to the auger trough 58.

A receiving deck 72 is mounted on the back end of the trailer 20. A chair 74 is provided on the receiving deck 72 for a second operator. Brackets 75 may be mounted adjacent the discharge door 62 to hold a garbage bag under the discharge door 62 to catch the litter as it is expelled from the container 27, or, a commonly known bag holder may be used to hold the garbage bag.

The second operator changes the garbage bags when they are full.

In operation, litter, leaves and other debris are sucked in through the suction mouth 46 by the suction force generated by the centrifugal fan 24. The litter that is sucked in then proceeds up the large flexible coupling conduit 48 and into the fan shroud 26. Once inside the fan shroud 26, the litter is shredded by the fan 24 and blown through the chute 29 into the closed container 27.

Once the litter is within the chamber of closed container 27, the air speed is reduced, thus allowing the litter to fall downward where it is funneled down toward the auger 56 by the slanted side walls 31 and the air flow generated by the bottom exhaust port 68. The auger 56 then compacts the litter while at the same time conveying the litter toward the discharge door 62. The litter is pushed by the auger 56 through the discharge tube 59 and compressed in the discharge tube and against the spring loaded discharge door 62. When the desired compression ratio has been achieved and the force on the discharge door 62 is great enough, the door 62 is forced open and the compressed litter is expelled on a continuous basis and is then caught in garbage bags.

Air from the closed container 27 is primarily expelled through the top exhaust port 64. Air is fed down to the exhaust manifold 44 through flexible coupling conduits 52 where it is exhausted toward the ground directly in front of the suction mouth 46. The purpose of exhausting the air in front of the suction mouth 46 is two-fold. The first reason is to help stir up litter buried deep in the grass thus allowing the suction mouth 46 to vacuum it up. The second reason is because during the vacuuming process, dirt and dust particles will be sucked up into the closed container 27, and the same dirt and dust particles will then be exhausted by the top exhaust port 64. If the exhaust ports 50 were positioned well behind the suction mouth 46, an objectionable cloud of dirt and dust could be generated. By placing the exhaust ports 50 in front of the suction mouth 46, the dirt and dust are once again sucked back in through the suction mouth 46, thus reducing the dust in the operating environment.

In another preferred embodiment, at least one of the number of exhaust ports 50 may be positioned slightly behind the suction mouth 46 angled forward to exhaust the air into the ground in the proximity of the suction mouth 46. This has the added feature of stirring up trash buried deep in the grass with an angular air flow as opposed to a direct downward force, while retaining the recirculating benefit of the previous embodiment.

Although the present invention has been described with reference to preferred embodiments, workers skilled in the art will recognize that changes may be made in form and detail without departing from the spirit and scope of the invention.

What is claimed is:

1. A vacuum trailer for picking up litter from a ground surface having a frame towable behind a prime mover, the vacuum trailer having impeller means for creating a suction force to collect the litter, comprising:
    containing means on the trailer connected to an output of the impeller means for containing collected litter, the containing means having a first air exhaust means for expelling air therefrom and a first filter means adjacent the first air exhaust means for filtering the expelled air;
    intake means connected to the impeller means to apply the suction force for collecting litter;
    support means for supporting the intake means, the support means pivotally connected to the frame;
    compressing and discharging means in the containing means for compressing compressible collected litter and discharging the litter from the containing means; and
    receiving means for receiving the discharged litter, the receiving means having a receiving deck carried on the frame.

2. The vacuum trailer of claim 1 and a flexible coupling conduit connected at the first exhaust means and having a second end supported by the support means.

3. The vacuum trailer of claim 1 wherein the containing means includes a second air exhaust means for expelling air therefrom and a second filter means adjacent the second air exhaust means for filtering the expelled air.

4. The vacuum trailer as in claim 3 wherein the second exhaust means is below the compressing and discharging means.

5. The vacuum trailer as in claim 3 wherein the second filter means is a mesh screen positioned between the second exhaust means and the compressing and discharging means.

6. The vacuum trailer of claim 1 wherein the impeller means is a centrifugal fan housed in a fan shroud.

7. The vacuum trailer of claim 1 wherein the containing means is a closed container in communication with the fan shroud.

8. The vacuum trailer of claim 1 wherein the support means is a pivotable deck, the deck having a suction mouth and also supporting an exhaust manifold, the exhaust manifold comprising a plurality of exhaust ports which are connected to the first air exhaust means of the closed container by flexible coupling conduits, the suction mouth being positioned adjacent to the exhaust ports and being connected to the fan shroud by a flexible coupling conduit being movable by a hydraulic cylinder mounted between the frame, and the deck for controlling pivoting of the deck.

9. The vacuum trailer of claim 8 and gauge wheels mounted on the deck to keep the suction mouth a constant distance from the ground.

10. The vacuum trailer as in claim 1 wherein the compressing and discharging means is a helical auger mounted in an auger trough inside the closed container to volumetrically compress the collected compressible litter and to discharge the compressed litter from the closed container through an exit opening.

11. The vacuum trailer as in claim 10 wherein the helical auger volumetrically compresses the compressible litter by a ratio of greater than 3:1.

12. The vacuum trailer as in claim 1 wherein the receiving means for receiving the discharged compressed litter is a garbage bag.

13. The vacuum trailer as in claim 1 and an operator support seat mounted on the rear of the frame adjacent the receiving means.

14. The vacuum trailer as in claim 1 wherein the first air exhaust means is at the top of the closed container.

15. The vacuum trailer as in claim 1 wherein the first filter means is a mesh screen positioned between the first air exhaust means and the interior of the closed container.

16. A vacuum trailer for picking up litter having a frame towable behind a tractor, the vacuum being powered by the tractor's power take-off shaft, the vacuum trailer having a centrifugal fan housed in a fan shroud for providing a suction force at an intake and having an air outlet, the invention comprising:

a closed container in communication with the outlet of the fan shroud for receiving litter, the containing means having a first air exhaust means for expelling air therefrom and a first filter means adjacent the first air exhaust means for filtering the expelled air;

a pivotable intake and exhaust deck, the intake and exhaust deck having an exhaust manifold and a suction mouth, the exhaust manifold having a plurality of exhaust ports which are connected to the first air exhaust means of the closed container by flexible coupling conduits, the suction mouth being positioned adjacent to the exhaust ports and connected to the intake of the fan shroud via a flexible coupling conduit, a hydraulic cylinder mounted to the frame and operably connected to the pivoting intake and exhaust deck to control pivoting thereof, the pivoting intake and exhaust deck having gauge wheels to keep the suction mouth a constant distance from the ground;

a helical auger mounted inside the closed container to volumetrically compress compressible collected litter the helical auger discharging the litter through an exit opening in the closed container; and receiving means for receiving the discharged compressed litter on the frame.

17. The vacuum trailer as in claim 16 wherein the means for receiving the discharged collected litter is a garbage bag.

18. The vacuum trailer of claim 16 wherein the containing means includes a second air exhaust means for expelling air therefrom and a second filter means adjacent the second air exhaust means for filtering the expelled air.

19. The vacuum trailer as in claim 18 wherein the auger is mounted in an auger trough and wherein the second air exhaust means is below the helical auger and extends through the auger trough.

* * * * *